Sept. 29, 1942.   M. BEREK ET AL   2,297,452
PHOTOGRAPHIC OBJECTIVE
Filed April 22, 1941
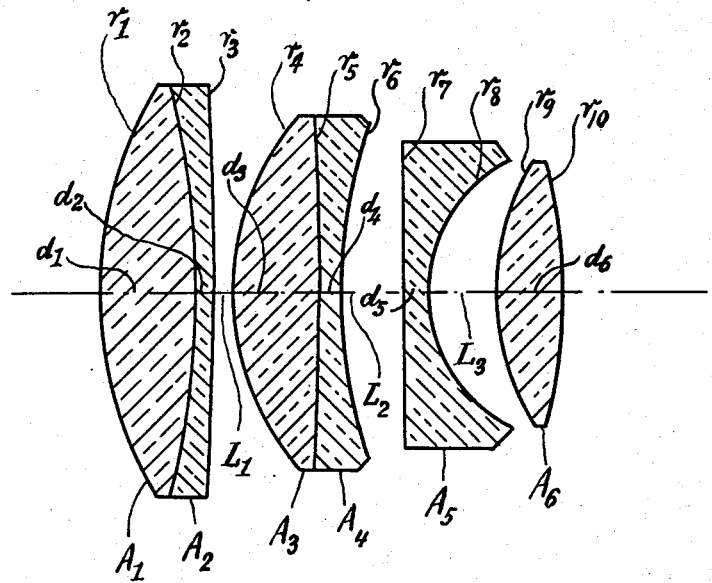
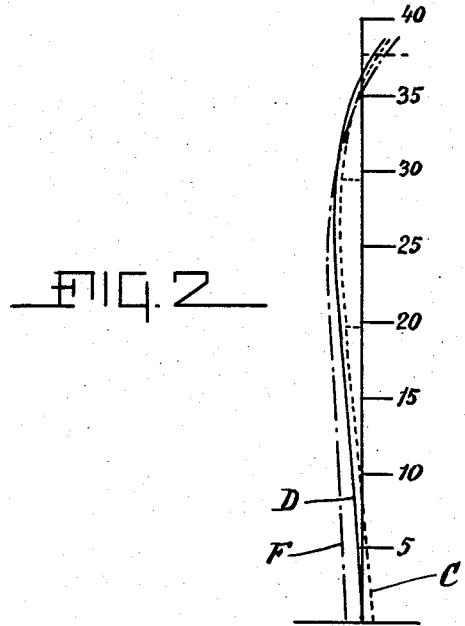
MAX BEREK.
OTTO ZIMMERMANN.
GUSTAV KLEINEBERG
INVENTORS.
BY
Ivan E. A. Konigsberg
Atty Patented Sept. 29, 1942

2,297,452

UNITED STATES PATENT OFFICE 2,297,452

PHOTOGRAPHIC OBJECTIVE

Max Berek, Otto Zimmermann, and Gustav Kleineberg, Wetzlar, Germany; vested in the Alien Property Custodian Application April 22, 1941, Serial No. 389,796
In Germany May 6, 1940

1 Claim. (Cl. 88—57)

This invention relates to improvements in photographic objectives of the triplet type in which the first collective member is split up into two collective members each of which contains a cemented surface. The second member is a simple dispersive lens. The third member is a simple collective lens. The system therefore includes four lens elements. The distance between the third and the fourth lens element is greater than half the distance between the second and the third lens element. This type may be used with advantage for objectives with large apertures and moderate angles of view. Under these conditions corrections for aperture errors and color errors may be made quite easily.

The object of this invention is to provide an improved photographic objective of the type set forth in which chromatic corrections to a very great extent may be made for very large apertures. In accordance with the invention this object is accomplished by making the simple dispersive (third) lens element of a glass having a dispersion ratio or Abbe number or $\nu$-value at least thirty per cent greater than the $\nu$-values of the glass bodies of the dispersive lens elements in the first two collective elements. The $\nu$-value of the simple dispersive (third) lens element must at the same time be at the most twenty percent less than the $\nu$-value of the last (fourth) collective lens element.

In the accompanying drawing illustrating the invention the several lenses are marked A1 to A6 inclusive. The radii of curvatures are marked $r1$ to $r10$ inclusive. The spaces between the lenses are marked L1, L2 and L3. The axial dimensions are marked $d1$ to $d6$ inclusive. Fig. 1 of the drawing is a sectional view through a lens system embodying the invention. Fig. 2 is a diagram of the spherical and chromatical correction curves.

The following example gives the data in accordance with the invention for a lens system having f=100 and aperture 1:1.3.

| Radii | Lens thicknesses | Air spaces | Refractive powers and $\nu$-values |
|---|---|---|---|
| r1 = +78.90 | d1 = 17.76 | L1 = 2.96 | A1 = 1.5338/55.4 |
| r2 = −167.68 | d2 = 3.94 | L2 = 12.82 | A2 = 1.7283/28.3 |
| r3 = −1183.62 | d3 = 18.74 | L3 = 12.82 | A3 = 1.6230/58.1 |
| r4 = +50.80 | d4 = 3.94 | | A4 = 1.7283/28.3 |
| r5 = −986.34 | d5 = 5.92 | | A5 = 1.6073/49.2 |
| r6 = +98.64 | d6 = 13.32 | | A6 = 1.6074/56.7 |
| r7 = ∞ | | | |
| r8 = +28.60 | | | |
| r9 = +47.34 | | | |
| r10 = −108.50 | | | |

The diagram in Figure 2 is based upon the following values:

| $h$ | $\begin{array}{c}D\\s'_k\end{array}$ | $\begin{array}{c}C\\s'_k\end{array}$ | $\begin{array}{c}F\\s'_k\end{array}$ |
|---|---|---|---|
| 0 | 34.875 | 35000 | 34.731 |
| 19.7 | 34.652 | 34752 | 34.572 |
| 29.6 | 34.580 | 34645 | 34.593 |
| 38 | 34.998 | 35005 | 35.167 |
| 38.5 | 35.055 | | |

In the last table of values $h$ represents the height above the optical axis of the system at which a particular ray strikes the object side of the first lens. $s'_k$ represents the distance, projected upon the optical axis, between the point at which the ray emerges from the last lens surface and the point at which such ray intersects the optical axis. $s$ in general represents such distance along the optical axis from the apex of the last lens surface to the plane where the image is formed. $k$ represents the general value for the lens surface under consideration and in the particular example $k$ has the value of 10. D, C and F are the Fraunhofer lines of the spectrum. The refractive indices of the glass are calculated with respect to the particular Fraunhofer lines. the glass having different refractive powers for the different colors of the spectrum.

We claim:

An objective lens system of the character described comprising four lens members axially alined and air spaced apart, namely a first collective member and a second collective member, each of which contains a dispersive cemented surface, a third simple dispersive lens member and a fourth simple collective lens member, the distance between the third and the fourth lens member being greater than half the distance between the second and the third lens member, characterized by that the $\nu$-value of the glass in the third lens member is at least thirty percent greater than the $\nu$-value of the glasses in the dispersive elements of the collective lens members and at the same time at the most twenty percent lower than the $\nu$-value of the glass in the fourth lens member, said $\nu$-values being the dispersion ratio or Abbe number of the respective glasses used in the lens members.

MAX BEREK.
OTTO ZIMMERMANN.
GUSTAV KLEINEBERG.